Figure 1:
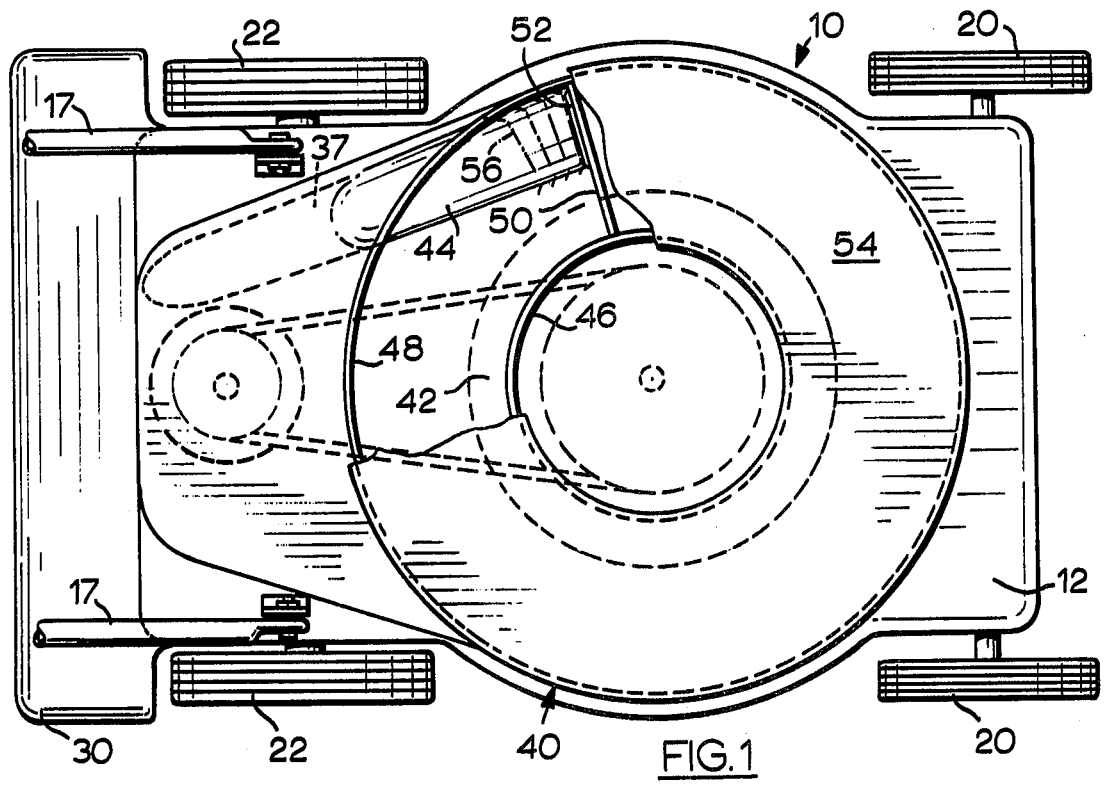

United States Patent [19]

Szymanis

[11] 4,081,947
[45] Apr. 4, 1978

[54] ROTARY LAWN MOWER WITH SEPARATE GRASS PICK UP

[75] Inventor: Edward Szymanis, Midhurst, Canada

[73] Assignee: Canadian General Electric Company Limited, Toronto, Canada

[21] Appl. No.: 714,974

[22] Filed: Aug. 16, 1976

[30] Foreign Application Priority Data

Aug. 21, 1975 Canada .................................. 234102

[51] Int. Cl.² ........................................... A01D 87/10
[52] U.S. Cl. ....................................... 56/13.3; 56/202
[58] Field of Search ............................. 56/12.8–13.4, 56/328 R, 202

[56] References Cited

U.S. PATENT DOCUMENTS

| 2,491,544 | 12/1949 | Arkenberg | 56/12.9 |
| 2,920,435 | 1/1960 | Vallone | 56/13.3 |
| 3,430,421 | 3/1969 | Matthews | 56/12.9 |

*Primary Examiner*—Russell R. Kinsey
*Attorney, Agent, or Firm*—R. A. Eckersley

[57] ABSTRACT

A grass collector for a rotary lawn mower comprises a base and a pair of generally solid and concentric annular walls. A grass inlet is provided in the base preferably of volute form adapted to connect with an outlet in the mower deck. The collector is positioned on the deck of the mower substantially within the wheelbase thereof, contributing to increased stability of the mower, a baffle situated to the rear of the inlet wall interconnects the base and annular walls, a lid for the collector permits the egress of air therefrom.

15 Claims, 4 Drawing Figures

ROTARY LAWN MOWER WITH SEPARATE GRASS PICK UP

This invention relates to improvements in lawn mowers of the rotary type.

In general lawn mowers of the above type comprise one or more cutting blades mounted within a cutting chamber for rotation in a generally horizontal plane, grass cuttings being ejected from the chamber through a chute. A principal hazard in the use of these lawn mowers concerns stones or other objects which may be struck by the cutting blade and ejected through the chute with startlingly high velocities. A somewhat related hazard concerns accidental damage to feet or other body members that my be introduced through the chute into the cutting orbit of the blade.

Many varied solutions to these problems have been proposed, including chute guards and so-called chuteless mowers. Upon examination the latter are usually found to incorporate a chute although this is inactivated when the mower is used without a grass collector. As with many interlocking devices, they may usually be circumvented, hence these methods may not be regarded as being complete solutions.

My invention contemplates a lawn mower wherein the cutting chamber in imperforate, at least in terms of the egress of grass clippings therefrom. Such construction is not capable of being operated in a manner wherein any chute may be left open to give access to the cutting chamber. My invention further contemplates a lawn mower structure wherein rearwardly of the cutting chamber and external thereto is located a second chamber wherein vacuum means is provided for collecting grass cuttings. In operation grass is cut in the cutting chamber and mulched therein as desired. The grass cuttings are transferred to the vacuum chamber by passing beneath a wall separating the cutting and vacuum chambers. In the event that a stone or other similar object is struck by the cutting blade it will normally be contained within the cutting chamber until such time as it falls to the ground. As the vacuum chamber passes over the object its energy will be substantially expended, and the probability of its being picked up with the cuttings and ejected in a dangerous manner is substantially diminished.

Preferred embodiments of lawn mowers falling within the scope of my invention may have other distinct advantages in terms of safety. In the rotary lawn mowers of the prior art four different functions are effected by the cutting blade. These are
 (i) erecting the grass prior to cutting
 (ii) cutting the grass
 (iii) mulching the grass cuttings
 (iv) ejecting the mulched cuttings.
These functions may be optimally performed at differing blade speeds, but the adopted speed may approach the maximum permissible limit of 19,000 ft./minute tip speed, no load, that at which the ejection function is most efficiently performed. The cutting function of the blade may be performed at much lower speeds. Considering a mower having the following design parameters
 Double ended blade, diameter — 18 inches
 tip speed — 17,500 ft/min
 cutting portion of blade — 3 inches at each end
 speed of forward travel of mower 300 ft/min
(brisk walk) and considering the blade to cut only through an arcuate path of 0° to 180° (the datum line being transverse to the forward direction of travel of the mower), the most critical cutting area i.e. that wherein the blade is at 90°, will be swept approximately 6 times by cutting portions of the blade. I find that this may be reduced by some 2-3 times by reducing the tip speed correspondingly. Since the energy with which stones or other objects struck by the blade are propelled is proportional to the square of their velocity, it will be apparent that their energy may be reduced by a factor of some 4 to 9 times. Additionally the kinetic energy of the cutting blade may be reduced by this factor, hence in the event of the accidental introduction of a body member into the orbit of the blade, the destructive impact and ensuing damage may be significantly less.

The first and fourth of the listed functions, those of erecting and ejecting, are effected by using the blade as an air propeller. For this purpose portions of the blade may be pitched, or upstanding vanes formed thereon or attached thereto. In either case the vertically oriented blade surface is significantly increased, thereby increasing proportionately the probability of a stone or other object being struck and propelled in a hazardous manner from the blade. In the lawn mower of my invention wherein the cutting blade is not required to shift large quantities of air, the blade may be substantially flat or finely pitched as will be later discussed, hence there will be a reduced probability of stones being struck in the aforesaid manner.

In its most basic form, my invention comprises a rotary lawn mower having a cutting chamber and at least one cutting blade journalled for rotation therein in a horizontal plane. The cutting chamber is formed by a deck and a skirt downwardly dependent therefrom, and is substantially imperforate. A second chamber, separate from the cutting chamber and external thereto, is situated rearwardly thereof; situated in the second chamber is a vacuum means including a rotary vacuum impeller the blades of which are out of contact with the mown surface. Desirably rearward portions of the skirt form a common barrier wall with the vacuum chamber.

Figure 2:
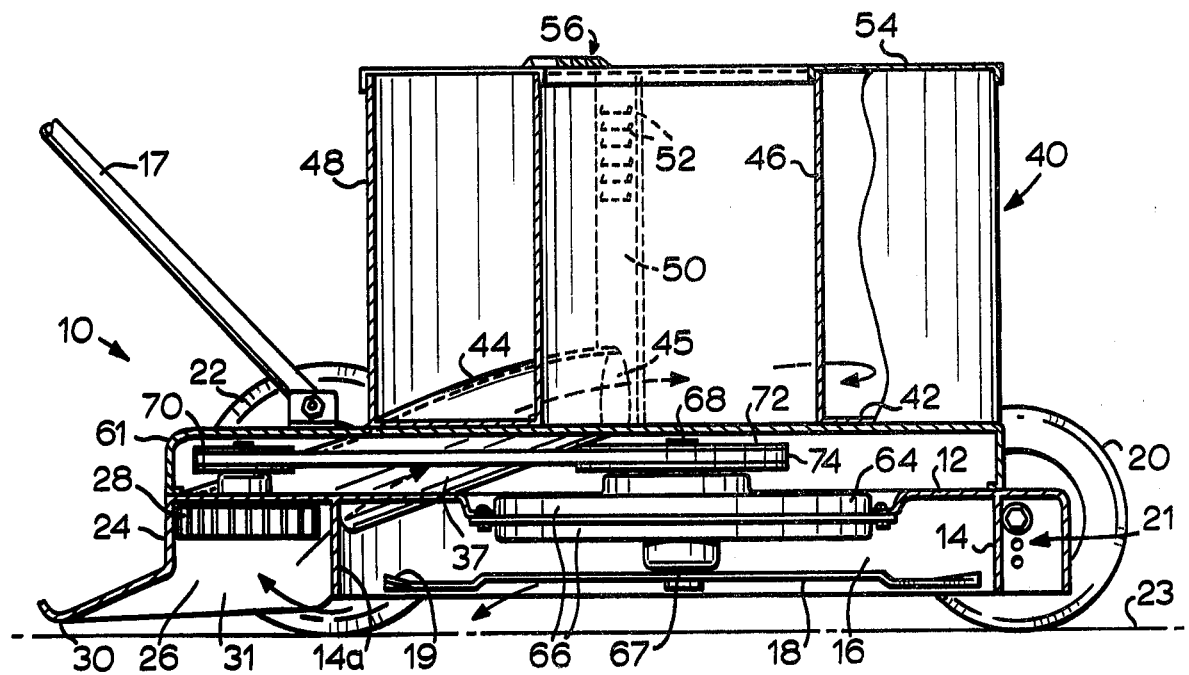
Figure 3:
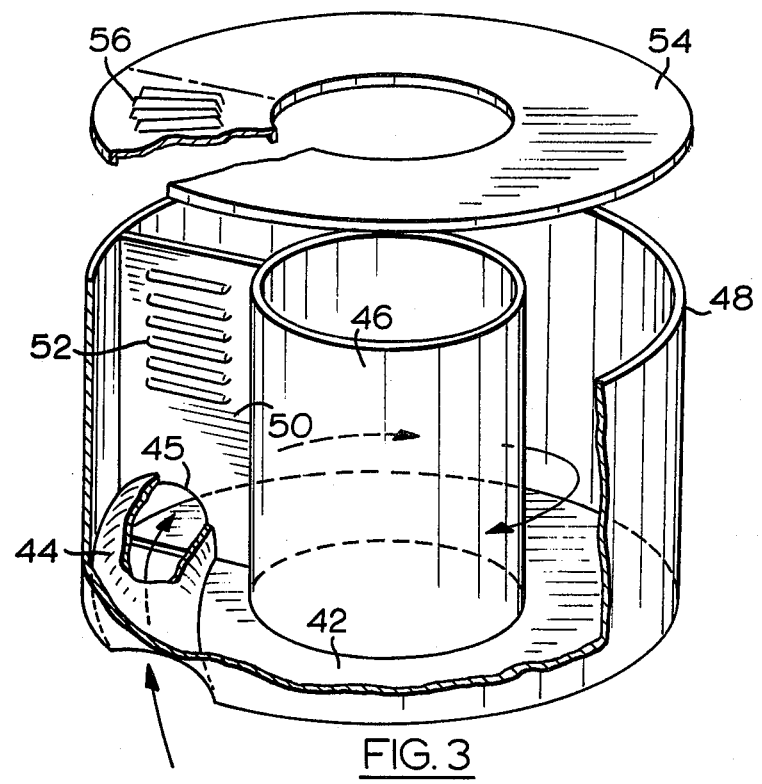
Figure 4:
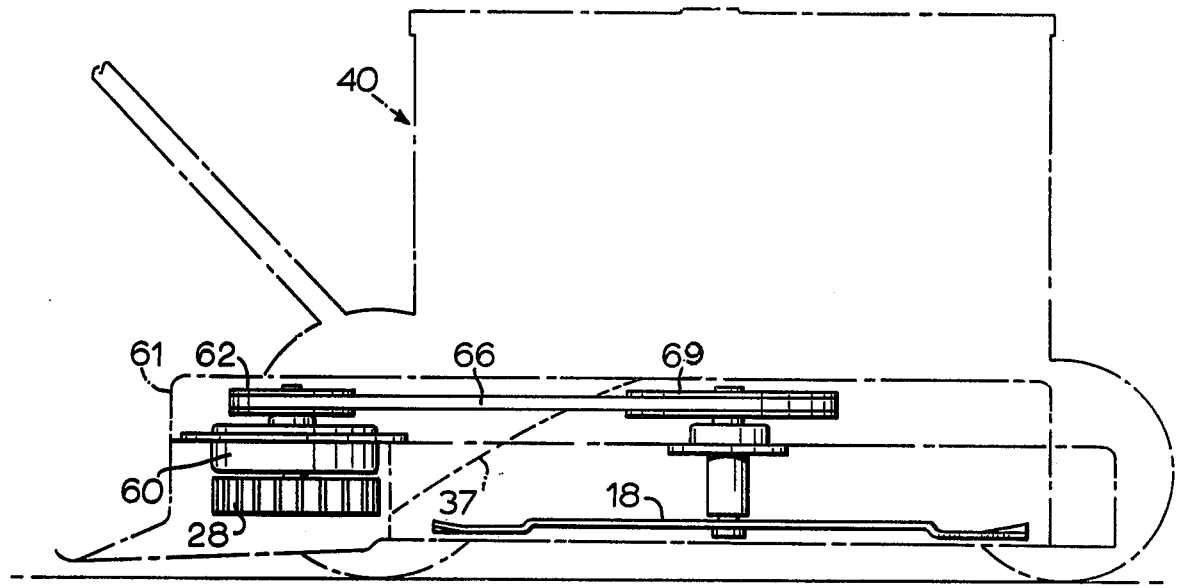

My invention will be further described with reference to a preferred embodiment thereof, as illustrated by the accompanying drawings which show in FIG. 1, a plan view of a rotary lawn mower of my invention, in FIG. 2, a side elevation partially cut away and partially in section of the rotary lawn mower of FIG. 1, in FIG. 3, detail of a novel grass collector that may be employed with the lawn mower of my invention, in FIG. 4, a schematic side elevation of a lawn mower of this invention similar to that of FIG. 2 but showing an alternative mechanical arrangement.

Referring now to the illustrations, a lawn mower which is indicated generally by the numeral 10 comprises a deck 12 having a skirt 14 downwardly dependent therefrom, the space enclosed by skirt 14 forming a cutting chamber 16. Within the cutting chamber is mounted a cutting blade 18 for rotation about a generally vertical axis. Deck 12 is mounted on wheels 20 at the forward end thereof and 22 at the rearward end thereof for travel across a ground surface 23. A handle 17 is secured to the rear portions of deck 12 for the manipulation of lawn mower 10. Cutting chamber 16 is essentially imperforate in the sense that there is no opening in any of the walls defining the chamber 16 through which grass cuttings are designed to pass.

Deck 12 extends rearwardly of cutting chamber 16 to include a vacuum, chamber 26. Desirably chamber 26 is located immediately to the rear of cutting chamber 16, and part of skirt 14, shown as 14a, is common to both chambers. Apron wall 24, which depends from deck 12, and common wall portion 14a, together define chamber 26. Within chamber 26 is mounted for rotary movement about a generally vertical axis a multibladed air impeller 28. Whilst a contrifugal impeller is particularly illustrated, an axial bladed impeller could equally be employed. The impeller is vertically spaced from ground surface 23.

Vacuum chamber 26 has an inlet 31 close to ground surface 23. Desirably the inlet should be maintained at a relatively constant distance from ground surface 23. This requirement is generally inimicable with the provision of height adjusters on both forward wheels 20 and rearward wheels 22 as is usual in the art. However the condition whereby inlet 31 is maintained at a constant level from ground surface 23 may be approximated when rear wheels 22 are of a larger diameter than front wheels 20 and wherein height adjustment such as is shown generally as 21 is applied to the front wheels only.

In operation, grass cuttings in chamber 16 are transferred to chamber 26 by passage beneath common wall 14a. This action is accomplished by either of two mechanisms, in practise both of which apply. In the first, the grass cuttings drop onto ground surface 23, and, as mower 10 advances, inlet 31 moves to be positioned over the cuttings. In the second, the current of air drawn by impeller 23 maintains cuttings in suspension as they pass under common wall 14a. This second mechanism of transfer may be enhanced by decreasing the depth of common wall 14a somewhat so that it is approximately flush with the level of blade 18. It is further enhanced by the provision of trailing ground contactor 30 which reduces the ingress of air into inlet 31 rearwardly of chamber 26 so as to preferentially draw air from beneath the cutting chamber 16. The air current will have no effect upon a stone or other object which might be struck and propelled by cutting blade 18, and the probability of the propelled object reaching impeller blade 26, which is located remotely from ground surface 23, is extremely low. Vacuum chamber 26 and associated ground contactor 30 have an additional secondary function in providing a foot guard means whereby the feet or other body portions of an operator manipulating mower 10 by means of handle 17 will be substantially physically precluded from being introduced into the orbit of cutting blade 18 from the rear of mower 10.

Considering certain design parameters of lawn mower 10, it is neither necessary nor desirable that cutting blade 18 propel large quantities of air as in the prior art. The velocity of the blade may therefore be markedly reduced in comparison to prior art norms where the blade is required to expell cuttings from the cutting chamber. In practise I find that the blade tip speed may be reduced from about 18,000 ft/minute to some 6–9,000 ft/minute. Such reduction has the earlier mentioned important advantages of reducing both the kinetic energy of the blade and that of objects struck and propelled by it by a factor of some 4–9 times. Additionally, manufacturing problems are reduced, as the balance of the cutting blade becomes less critical at these lower speeds. The volume of swept air that is desirable will depend upon which of the two mechanisms for the transference of grass cuttings from the cutting chamber to the vacuum chamber it is desired to promote, and the degree of mulching required. In the prior art relatively large upstanding projections may be formed on cutting blade 18 for the purpose of propelling air. The probability of an object being struck and propelled by the cutting blade 18 is proportional to the vertically projected area of the blade. I find that it is generally desirable to provide only small upstanding projections upon blade 18, as by upturning the blade at trailing corners 19 thereof. It may be seen that the probability of an object being struck and forwardly propelled may be significantly reduced in comparison to the prior art.

Grass cuttings from vacuum chamber 26 may be exhausted and dispersed through any convenient opening from the vacuum chamber. In my copending United States application Ser. No. 714,975, filed Aug. 16, 1976, commonly assigned herewith, I describe a novel grass catcher, one embodiment of which is shown herein and referenced by the numeral 40. Briefly such grass catcher is of a generally toroidal shape and is formed from a basewall 42 having an entry port 44 having an opening 45 therein in communication with duct 37 which exhausts chamber 26. Upstanding from base 42 and enclosing entry port 44 therebetween are inner and outer annular walls shown respectively as 46 and 48; a baffle wall 50 interconnects the annular walls and base 42. In operation, air and grass clippings exhausted from vacuum chamber 26 pass via duct 37 to port 44. This latter element is preferably a volute passage having an inverted U shaped radial cross section which increases in height, and preferably in width in the direction of passage of the air stream towards opening 45. Air and grass cuttings entering catcher 40 are oriented in port 44 in an upward and outward flow path which is channeled by air directing walls 46 and 48 of catcher 40 in an upward spiralling movement until it reaches baffle 50, placed preferably immediately before entry port opening 45. Baffle 50 may have venting louvres 52 formed in the upper part thereof which permit some cycling of air in the toroid. The majority of air exhausts via air vents formed in a lid 54 which forms a cover for grass catcher 40. Lid 54 may be of a generally impervious material, in which case louvres 56 may be formed therein to permit the escape of air. Alternatively lid 54 may be constructed at least partially of a foraminaceous material desirably having a graded pore size increasing from above port opening 45 around to baffle 50 whereby the exhaust of air from catcher 40 may be preferentially controlled. Typical dimensions of a catcher 40 for a single blade 18 inch diameter lawn mower are outer annular wall, diameter 18 inches, inner annular wall, diameter 8 inches; height 10 inches. It will be apparent that other grass catching arrangements may be employed, but that described has the advantage of being compact and substantially contained within the wheelbase of lawn mower 10 thereby increasing its stability and manouverability.

Lawn mower 10 is generally of a light construction intended to be hand pushed over a surface to be mown although not restricted to such. The preferred power source as a prime mover for cutting blade 18 and impeller 28 is an electric motor. Preferably a single motor is used to power the two rotating blades. Two different configurations are contemplated, one of which is illustrated schematically in FIG. 4, wherein an electric motor 60 directly drives impeller 28, and blade 18 is indirectly driven by pulleys 62 and 69 and endless belt 66 passing therebetween. Cover 61 encloses motor 60, belt 66 and the associated pulleys and journals. The pulley and belt arrangement for driving cutting blade 18 from motor 60 provides the necessary speed reduction for the blade 18 and additionally a clutch function to guard the blade from accidental damage. The second contemplated configuration is shown in greater detail in FIGS. 1 and 2. Here cutting blade 18 is coupled directly to the output shaft 67 of an electric motor 64. Impeller 28 which is journalled for rotation in a rearward portion of deck 12 forming part of vacuum chamber 26, is driven via pulleys 70 and 72 and belt 74 from an upwardly projecting drive shaft 68 which projects from motor 64 above cutting chamber 16. Pulleys 70 and 72 together with belt 74 form a suitable step up drive for impeller 28, and are enclosed above deck 12 by enshroudment 61 spaced from the deck, as in the first described arrangement.

It will be apparent that my invention is not limited by the motive source of cutting blade 18 or impeller 28, and that any convenient prime mover may be employed as desired. However, in order to enjoy to a maximum the benefits of my invention it is believed to be advantageous to employ as a prime mover a motor 60 or 64 of the permanent magnet pancake type. Such motors are known generally in the art; specific reference may be made to copending United States patent applications Ser. No. 502,007 filed Sept. 24, 1973 now U.S. Pat No. 3,979,619 and Ser. No. 534,058 filed Dec. 18, 1974 to Whiteley, each of which is commonly assigned herewith, for recent improvements therein which make the motors particularly suited to use as herein.

It will also be apparent to those skilled in the art that many arrangements may be employed other than those which have been described for illustrative purposes, hence the scope of my invention is not to be limited to the above embodiments but according to the appended claims.

What I claim as new and desire to secure by Letters Patent of the United States is:

1. In a rotary lawn mower comprising a cutting chamber designed to be supported by wheels and forwardly moved over a surface to be mown, said mower having a deck including a downwardly dependent skirt defining said cutting chamber, a cutting blade mounted within said chamber for rotary movement about a vertical axis, the improvement wherein said deck and skirt are essentially imperforate whereby discharge of cuttings from said chamber occurs by passage of said cuttings from beneath said skirt, and wherein grass collecting means including vacuum means is provided rearwardly of said cutting chamber and external thereto, said vacuum means comprising a vacuum chamber having an inlet proximate the mown surface and a rotary impeller vertically spaced from said surface.

2. A rotary mower as defined in claim 1 wherein rearward portions of said skirt form a common wall with said vacuum chamber.

3. A rotary mower as defined in claim 2 wherein said impeller is directly coupled to the output shaft of a prime mover.

4. A rotary mower as defined in claim 3 wherein said cutting blade is driven from said prime mover by speed reducing means including pulley and belt means.

5. A rotary mower as defined in claim 2 wherein said prime mover is a permanent magnet pancake form electric motor.

6. A rotary mower as defined in claim 2 wherein said cutting blade is directly coupled to the output shaft of a prime mover.

7. A rotary mower as defined in claim 6 wherein said impeller is driven from said prime mover by speed increasing means including pulley and belt means.

8. A rotary mower as defined in claim 7 wherein said prime mover is a permanent magnet, pancake form motor.

9. A rotary mower as defined in claim 2 wherein said common wall has a lower edge approximately in the plane of rotation of said cutting blade.

10. A rotary mower as defined in claim 8 wherein said motor includes an upwardly projecting drive shaft external to said cutting chamber, said upwardly projecting drive shaft driving said speed increasing means.

11. A rotary mower as defined in claim 10 wherein said deck extends rearwardly beyond said cutting chamber to form a portion of said vacuum chamber, and wherein said rotary impeller is journalled in said rearward deck portions.

12. A rotary mower as defined in claim 11 wherein said pulley and belt means is enclosed by a cover spaced from said deck.

13. A rotary mower as defined in claim 12 wherein a grass catcher is mounted on said cover.

14. A rotary mower as defined in claim 13 wherein said grass catcher is approximately co-extensive with said cutting chamber.

15. A rotary lawn mower as defined in claim 1 wherein said blade operates normally at a tip speed in the range of about 6000 to about 9000 ft./minute.

* * * * *